US009154384B2

(12) United States Patent
Khouri et al.

(10) Patent No.: US 9,154,384 B2
(45) Date of Patent: Oct. 6, 2015

(54) SENTIMENT BASED DYNAMIC NETWORK MANAGEMENT SERVICES

(75) Inventors: Felix Khouri, San Jose, CA (US);
Patrick Tsunehiro, San Francisco, CA (US); David C. White, Jr., Durham, NC (US); Vivek Santuka, Haryana (IN)

(73) Assignee: Cisco Technology, Inc., San Jose, CA (US)

( * ) Notice: Subject to any disclaimer, the term of this patent is extended or adjusted under 35 U.S.C. 154(b) by 909 days.

(21) Appl. No.: 13/354,616

(22) Filed: Jan. 20, 2012

(65) Prior Publication Data
US 2013/0191520 A1 Jul. 25, 2013

(51) Int. Cl.
G06F 15/16 (2006.01)
G06F 15/173 (2006.01)
H04L 12/24 (2006.01)

(52) U.S. Cl.
CPC ............ *H04L 41/18* (2013.01); *H04L 41/5067* (2013.01); *H04L 41/509* (2013.01)

(58) Field of Classification Search
USPC ......................................................... 709/223
See application file for complete search history.

(56) References Cited

U.S. PATENT DOCUMENTS

| 6,546,387 | B1* | 4/2003 | Triggs ...................................... 1/1 |
| 6,658,585 | B1* | 12/2003 | Levi ................................ 714/4.3 |
| 6,697,963 | B1* | 2/2004 | Nouri et al. ...................... 714/31 |
| 6,714,979 | B1* | 3/2004 | Brandt et al. .................. 709/225 |
| 6,763,376 | B1* | 7/2004 | Devine et al. .................. 709/223 |
| 6,990,518 | B1* | 1/2006 | Secer .............................. 709/223 |
| 7,478,151 | B1* | 1/2009 | Maiocco et al. ............... 709/223 |
| 7,483,970 | B2* | 1/2009 | Anuszczyk et al. ........... 709/224 |
| 7,797,409 | B1* | 9/2010 | Secer .............................. 709/223 |
| 7,813,493 | B2 | 10/2010 | Shaffer et al. |
| 8,098,273 | B2 | 1/2012 | Khouri et al. |
| 8,139,475 | B2* | 3/2012 | Vercellone et al. ........... 370/216 |
| 8,615,074 | B1* | 12/2013 | Rivier et al. ............. 379/265.06 |
| 2004/0033806 | A1* | 2/2004 | Daniel et al. .................. 455/450 |
| 2007/0160054 | A1 | 7/2007 | Shaffer et al. |
| 2007/0261121 | A1* | 11/2007 | Jacobson ........................ 726/26 |
| 2007/0263541 | A1* | 11/2007 | Cobb et al. .................... 370/235 |
| 2008/0049639 | A1* | 2/2008 | Wiley et al. ................... 370/252 |
| 2008/0098454 | A1* | 4/2008 | Toh ................................ 726/1 |
| 2008/0151931 | A1* | 6/2008 | Moran et al. .................. 370/465 |
| 2009/0028182 | A1* | 1/2009 | Brooks et al. ................. 370/466 |
| 2009/0227251 | A1* | 9/2009 | Lei et al. ....................... 455/425 |
| 2012/0317276 | A1* | 12/2012 | Muniraju ...................... 709/224 |
| 2012/0331135 | A1* | 12/2012 | Alon et al. .................... 709/224 |
| 2013/0080212 | A1* | 3/2013 | Li et al. ........................ 705/7.38 |
| 2013/0166738 | A1* | 6/2013 | Ivershen ....................... 709/224 |
| 2014/0098705 | A1* | 4/2014 | Chow et al. .................. 370/254 |
| 2014/0140213 | A1* | 5/2014 | Raleigh et al. ............... 370/235 |
| 2014/0207562 | A1* | 7/2014 | Gupta et al. ............... 705/14.41 |
| 2014/0241360 | A1* | 8/2014 | Jackowski et al. ........... 370/392 |

* cited by examiner

Primary Examiner — Melvin H Pollack
(74) Attorney, Agent, or Firm — Cindy Kaplan

(57) ABSTRACT

In one embodiment, a method includes receiving data for a customer, the data associated with a customer network, calculating at a network device, a sentiment for the customer based on the data, and modifying network management services for the customer based on the sentiment. An apparatus for sentiment based dynamic network management services is also disclosed.

18 Claims, 4 Drawing Sheets

SENTIMENT BASED DYNAMIC NETWORK MANAGEMENT SERVICES

TECHNICAL FIELD

The present disclosure relates generally to communication networks, and more specifically, to network management services.

BACKGROUND

Network management services help customers optimally manage their networks. The services are designed to improve the customer's service experience, allow the customer to better understand their network, and address customer's needs for network-wide availability and security.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
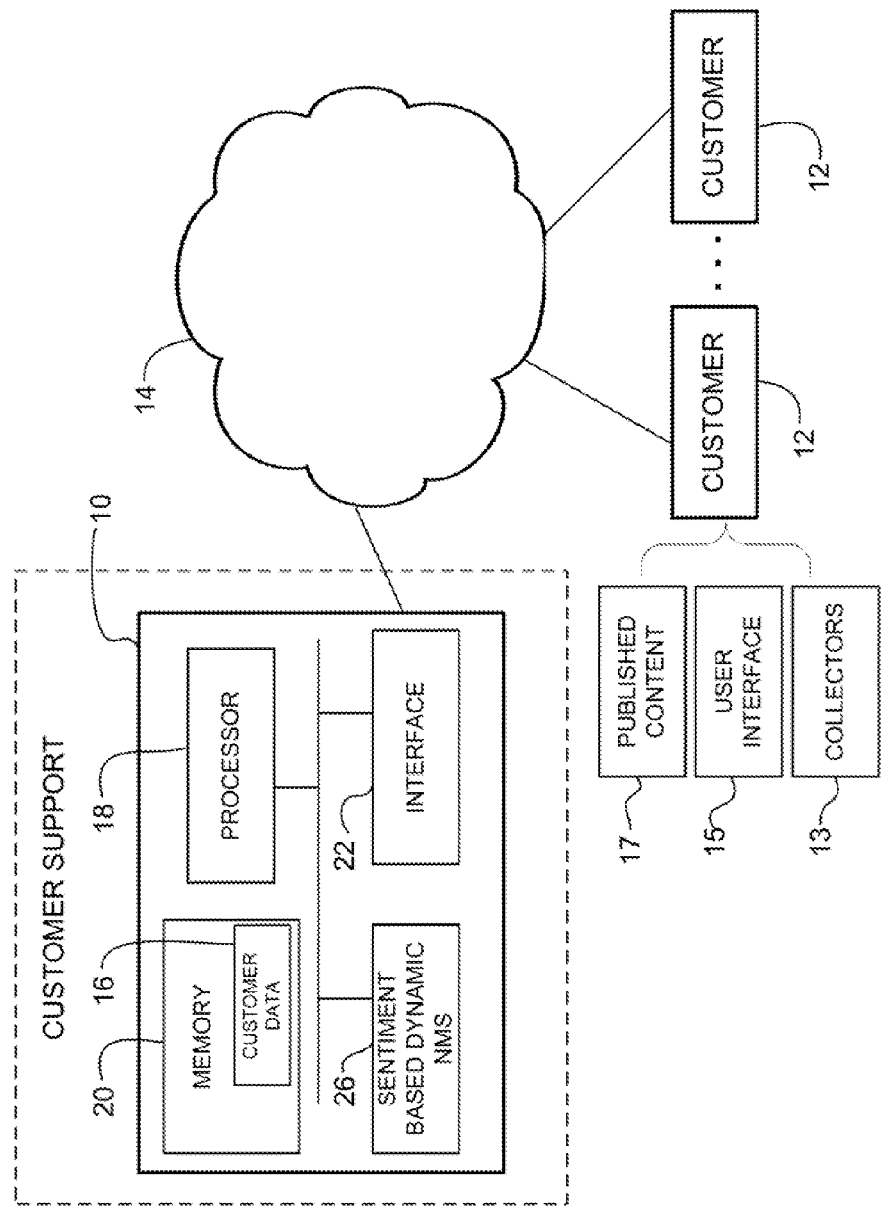
FIG. 1 illustrates an example of a network in which embodiments described herein may be implemented.

In one embodiment, a method generally comprises receiving data for a customer, the data associated with a customer network, calculating at a network device, a sentiment for the customer based on the data, and modifying network management services for the customer based on the sentiment.

In another embodiment, an apparatus generally comprises an analytic module for receiving data for a customer, the data associated with a customer network, and calculating a sentiment for the customer based on the data, a services module for modifying network management services for the customer based on the sentiment, and memory for storing the data.

Example Embodiments

The following description is presented to enable one of ordinary skill in the art to make and use the embodiments. Descriptions of specific embodiments and applications are provided only as examples, and various modifications, will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein may be used to improve customer satisfaction and optimize resource utilization for network management applications and services. As described below, customer sentiment is calculated and utilized to provide a user experience that proactively identifies unsatisfied customers and preempts escalation of customer complaints. The user experience can be dynamically tailored to provide unsatisfied customers a more friendly experience through access to highly skilled resources and priority assignments to their transactions. Customer sentiment is dynamically computed and used to modify content provided to the user and user interactions accordingly. As described in detail below, sentiment is computed using an analytic algorithm that leverages customer data and customizes the user experience to optimize resource utilization and improve customer satisfaction.

The term 'sentiment' as used herein refers to a satisfaction level or other indicator of a customer's satisfaction, attitude, view, thoughts, or opinion that can be quantitatively measured. The term 'customer' as used herein refers to a person (end user) or group of persons associated with a company, enterprise, service provider, partner, or other entity for which network management services are provided. The network management services may be provided, for example, by customer support for a computer networking company, equipment reseller, affiliate, or other entity that provides network management services. The network management services may include, for example, content (e.g., interactive content) for use by the customer, customer support (e.g., technical assistance, response to service requests) provided to the customer, or other applications or services associated with network management. Based on the customer sentiment, the network management services may be modified (e.g., different content provided, contact provided for general or highly skilled support, response time reduced, system behavior modified).

Referring now to the drawings, and first to FIG. 1, a network in which the embodiments described herein may be implemented is shown. For simplification only a small number of nodes are shown. A customer support network device 10 is in communication with one or more customers 12 via a network 14. The customer 12 includes any number of customer networks and network devices (e.g., routers, switches, gateways, servers, appliances, mobile devices, access points, controllers) located at one or more customer sites (e.g., headquarters, branch office, remote office). The customer network may include one or more data collectors 13 (e.g., appliance, router, or other network device or application installed at network device) positioned within the customer network to collect network data (e.g., performance, quality, reliability, bandwidth, latency, component or network failure). The customer 12 also includes a network management station or other customer device comprising a user interface 15 (e.g., graphical user interface displayed on a computer screen) and published content 17 displayed on the computer screen. As described below, the published content 17 and user interface 15 may be modified based on customer sentiment calculated using data collected at the customer support network device 10.

The network 14 may include one or more networks (e.g., local area network, metropolitan area network, wide area network, satellite network, enterprise network, Internet, intranet, radio access network, public switched network, virtual private network, or any other network). Communication paths between the customer support network device 10 and customers 12 may include any number or type of intermediate nodes (e.g., routers, switches, gateways, or other network devices), which facilitate passage of data between the network devices.

The network device 10 may be any device (e.g., server) or group of devices configured to provide network management services to one or more customers 12. The network device 10 is configured for receiving, processing, and storing customer data 16. The network device 10 may also include remotely located devices (e.g., storage for the network device). The network device 10 may also be in communication with other systems to link the received customer data with other customer information (e.g., sales, support contract data).

As described in detail below, the network device 10 includes a sentiment based dynamic network management services module 26 for use in calculating customer sentiment and modifying the customer experience (e.g., content presented, interactions, responses) based on the sentiment. The sentiment based dynamic network management services system 26 provides a network management function to customers 12, which can be accessed via the user interface 15 associated with the published content 17.

The network device 10 is a programmable machine that may be implemented in hardware, software, or any combination thereof. The network device 10 includes one or more processor 18, memory 20, and network interface 22. Memory 20 may be a volatile memory or non-volatile storage, which stores various applications, operating systems, modules, and data for execution and use by the processor 18. Customer data 16 for use in calculating customer sentiment along with the sentiment may be stored in memory 20 using one or more data structures (e.g., database).

Logic may be encoded in one or more tangible media for execution by the processor 18. For example, the processor 18 may execute codes stored in a computer-readable medium such as memory 20. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 22 may comprise one or more interfaces (linecards, ports) for receiving signals or data or transmitting signals or data to other devices. The interface 22 may include, for example, an Ethernet interface for connection to a computer or network.

Figure 2:
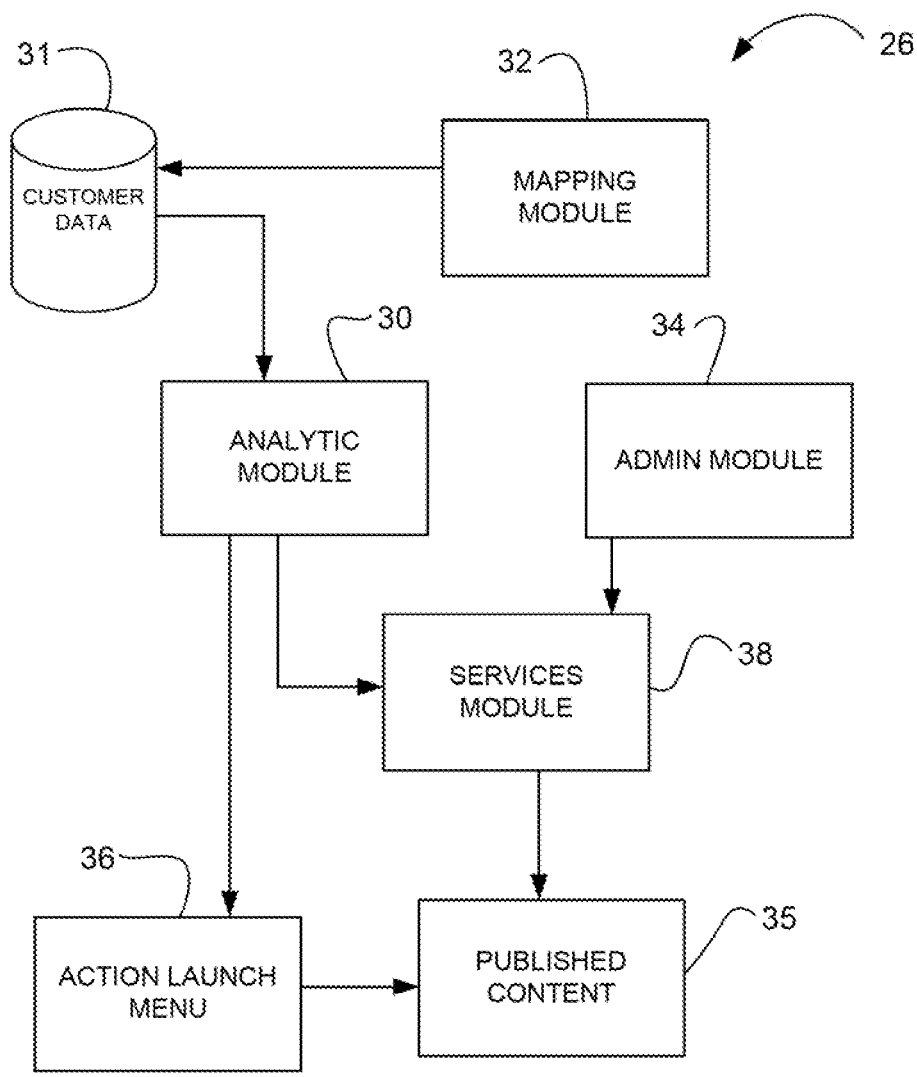
FIG. 2 depicts an example of a sentiment based dynamic network management services system for use in the network of FIG. 1.

It is to be understood that the network and network device 10 shown in FIG. 1 and described above is only one example and that different configurations of network devices or arrangement of networks may be used. For example, the network device 10 may further include any suitable combination of hardware, software, algorithms, processors, devices, components, or elements operable to facilitate the capabilities described herein FIG. 2 illustrates the sentiment based dynamic network management services system 26, in accordance with one embodiment. In the example shown in FIG. 2, the system 26 includes an analytic module 30 for calculating sentiment data based on customer data in database 31, a mapping module 32 for mapping users to a customer (e.g., based on log-in credentials, password, user identification), an administrative (admin) module 34 for providing content to a smart services module 38, an action launch menu 36 for providing menus in the published content 35 (described below with respect to FIG. 4), and the smart services module 38 for modifying content provided by the admin module 34 and user interactions based on sentiment calculations at the analytic module 30. The modules 30, 32, 34, 36, 38 shown in FIG. 2 may be, for example, an application, software, code, logic, device, or any other mechanism for performing the operations described herein.

It is to be understood that the components and arrangement of the sentiment based dynamic network management services system 26 shown in FIG. 2 and described below are only examples and that the system may include fewer, additional, or different components, without departing from the scope of the embodiments.

The analytic module 30 calculates the customer sentiment based on customer data stored in database 31. The database 31 may be a central storage device (e.g., intellectual capital repository) or may comprise a number of storage devices located throughout a customer support network. The customer data may be collected for a period of time (e.g., last 30 days or any other time period) and is associated with one or more customer networks (e.g., network devices, network services, customer support for network devices or services). The database 31 may receive data from collectors 13 located within the customer network or data input from the customer or customer support (e.g., service requests, products purchased, support response, survey results), as described below. The data may be sorted by subgroups within the database (e.g., users, network, branch, division, time period, or any other parameter).

The customer data may include, for example, number of service requests (e.g., support requests, trouble tickets) (closed, open, or both), age of requests or time between opening and closing of requests, and the number of times that the service requests have been moved from one support contact to another. This indicates that the previous support contact was unable to move the customer's issue towards a solution and is not indicative of workflow in a call center, where support contacts typically do not maintain ownership of issues. Data may also include number of parts returned (e.g., number of replacement parts shipped to a customer due to a failed or malfunctioning part) and number of repeat returns (e.g., shipment of same replacement part). Software issues (defects, bugs) may be categorized (e.g., high severity defect, minor defect). Customer data may also include results of a customer survey or other customer input. Network data may include, for example, a network health score based on up-time, quality, reliability, performance, or other parameters.

Communications between customer support agents and end users (customers) or communications posted by the customer on support community boards or other social media, that relate to the company providing the network management services or the company's products may be identified and analyzed to provide customer data. For example, communications may be monitored to collect data, including vocabulary used in the communication, phrases used in the interaction, or emotion associated with the interaction. Monitoring the emotion may involve determining if a caller sounds satisfied or unsatisfied, or if the caller and customer support are participating in a video conference, determining if the facial expression of the caller indicates whether the caller is satisfied or unsatisfied. Vocabulary may be monitored to determine if it indicates satisfaction and portrays positive emotion. A text analytics module may be used to detect or sniff for keywords or phrases that indicate a level of satisfaction. The measurement may be based on occurrence (or number of occurrences) of specified keywords. For example, the text analytics module may identify words such as satisfied, unsatisfied, helpful, unhelpful, answered, unanswered, good, bad, like, dislike, happy, unhappy, etc.

Other examples of customer data are described below with respect to Table I. It is to be understood that the customer data described herein for use in sentiment calculations are only examples and that other data or measurements may be used to identify the customer sentiment.

The analytic module 30 calculates a sentiment for the customer based on the customer data. Examples of sentiment calculations are described below with respect to Table I. Sentiment may be measured using one or more calculations. Multiple calculations are preferably used for a more accurate understanding of the customer sentiment. The data is preferably normalized to account for variations in network size. The sentiment may be updated or recalculated at periodic intervals or upon the occurrence of an event (e.g., new data received).

Based on the sentiment calculation, a sentiment is associated with the customer and provided to the smart services module 38 and action launch menu 36 for use in modifying the content and behavior of the network management services. The customer sentiment may be identified, for example, by a satisfaction level (e.g., highly satisfied, satisfied, neutral, unsatisfied, or highly unsatisfied). Other types of ratings or number of levels may also be used.

The administration module 34 is used by an administrator (e.g., customer support) to prepare content (e.g., information on network devices and networks) and input actions (e.g., open a service request, initiate a return, initiate a commerce engagement with the customer, etc.) to the system. The content may be a template, web page, or other graphical display for use by the customer. The content may be defined by rules (e.g., display selected content for specified customer). For example, a general report template may be provided, which is filled in with customer data. The admin module 34 provides content to the smart services module 38, which is automatically modified based on the sentiment calculated at the analytic module 30.

The admin module 34 may generate more than one version of the content, with one of the versions selected for display by the smart services module 38 based on the customer sentiment. For example, the admin module 34 may publish two web pages. The first page includes the desired content and a general support alias (e.g., e-mail, phone number, list of contacts, or other contact information) for a support person or group to assist the user, while the second page includes the desired content and a support alias leading to a highly skilled support person or group to assist the user. The two pages may be stored at the smart services module 38 and one of the pages selected based on the customer sentiment received from the analytic module 30.

The smart services module 38 receives customer sentiment (e.g., sentiment level) from the analytic module 30 and uses this sentiment to retrieve the appropriate content for display to the customer as published content 35. The smart services module 38 thus dynamically modifies the content provided by the admin module 34 based on the sentiment provided by the analytic module 30. For example, the first page with the general support alias is displayed for satisfied customers and the second page with the specialized support alias is displayed for customers that are highly unsatisfied and likely to escalate a problem. The system therefore preempts escalation of problems by the customer and optimizes resource utilization by making highly talented resources available to customers that are unsatisfied (or highly unsatisfied).

The smart services module 38 may also modify the behavior of the network management services based on the sentiment data. For example, the response time to display or update the published content 35 or respond to customer requests may be reduced. The response time for service requests or technical support may be reduced if the sentiment indicates that the customer is unsatisfied.

The smart services module 38 may update the network management services based on new sentiment as the sentiment is revised or may update the services after a specified time period.

Figure 3:
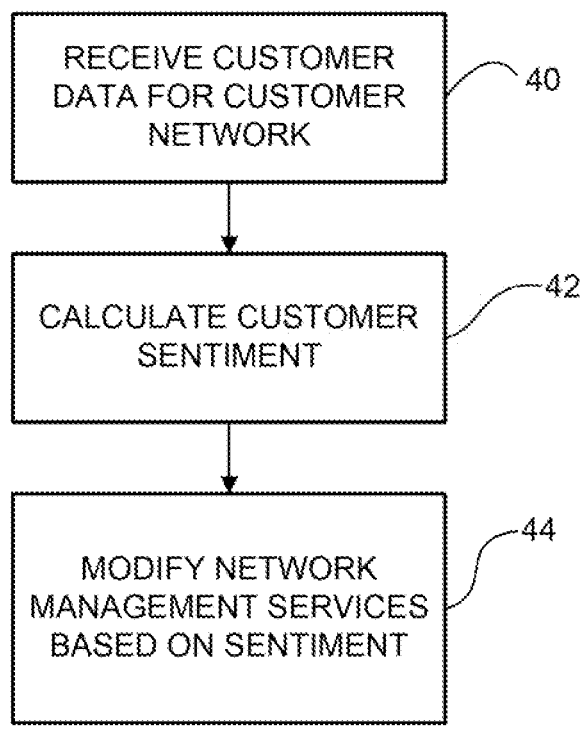
FIG. 3 is a flowchart illustrating an overview of a process for providing sentiment based dynamic network management services, in accordance with one embodiment.

FIG. 3 is a flowchart illustrating an overview of a process for providing sentiment based dynamic network management services, in accordance with one embodiment. At step 40, the system 26 receives data for a customer, the data associated with a customer network 12 (e.g., network device or component within network, network service, network customer support, network performance). The system uses the data to calculate a sentiment for the customer (step 42). The system modifies network management services for the customer based on the sentiment (step 44). The network management services may be modified, for example, to provide different content for display by the customer, type or level of customer support (e.g., response time, general or specialized support), or behavior (e.g., interaction, system response, or other system options).

It is to be understood that the process shown in FIG. 3 and described above is only an example and that steps may be added, modified, or combined, without departing from the scope of the embodiments.

Figure 4:
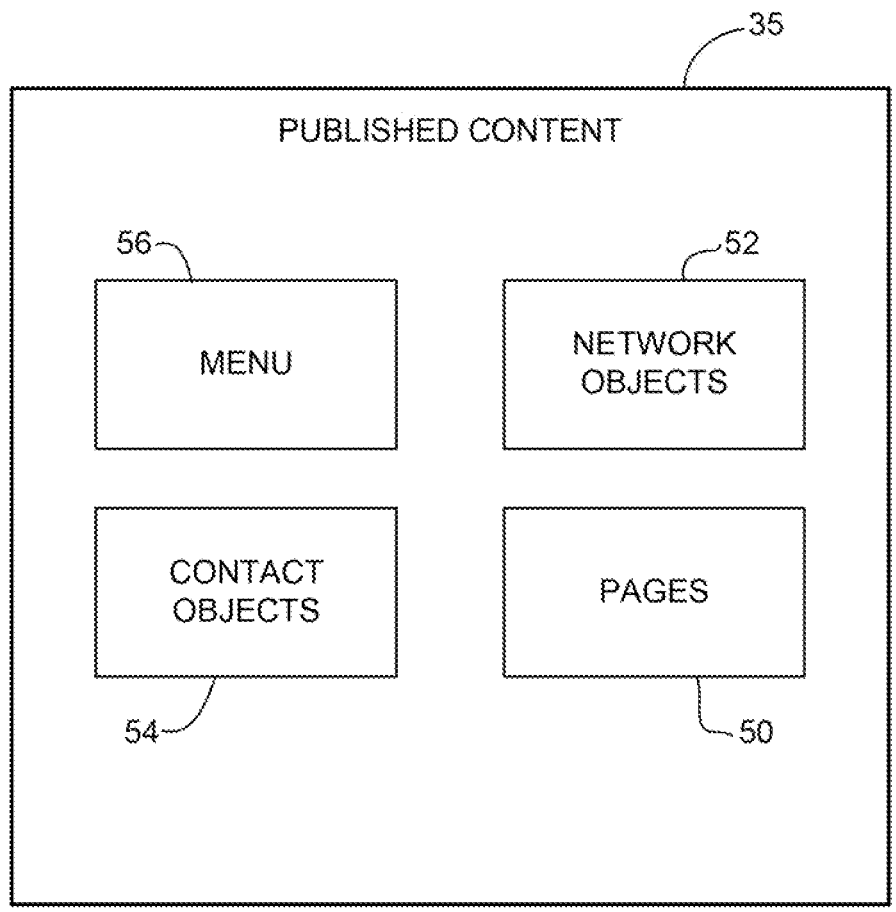
FIG. 4 is a block diagram illustrating components of published content provided by the sentiment based dynamic management services system, in accordance with one embodiment.

FIG. 4 schematically illustrates components of the published content 35. The system 26 may provide a view of the respective customer networks and details about the installed devices as published content 35. The published content 35 may include any number of pages 50 (e.g., HTML pages, views, screens). The content may also be flash format or other type of content. The system 26 allows users to browse through their networks, obtain information in the form of on-line/off-line reports, and take actions by clicking on network objects 52 (e.g., devices, or transactions associated with those devices) and then selecting actions to execute from a drop down menu 56 (e.g., open a service request on a device, renew a service contract) provided by action launch menu 36 (FIGS. 2 and 4). In addition to network objects 52, the system 26 supports contact objects 54 associated with one or more support person (e.g., customer support, technical support) available for interaction with the customer. Network objects 52 and contact objects 54 may be embedded in documents (e.g., HTML pages) or associated with other objects. For example, an administrator can associate an e-mail alias or a list of contacts with a given HTML page. The HTML page may include, for example, information about a specific service or a view of a network. This provides end users (customers) access to the associated resources from the customer support side that can provide assistance as needed. As described above, the network objects 52 or contact objects 54 may be modified or different pages 50 displayed based on the customer sentiment.

The action launch menu 36 provides a contextual based list of actions presented as menu 56 (e.g., drop down menu) in the published content 35 (FIGS. 2 and 4). For example, when a user passes a pointer (e.g., using a mouse or other user interface) over a smart object (network object 52 or contact object 54), the user may be presented a choice to launch user interface applications that have been registered for the object. When the user clicks to launch an application, the action launch menu 36 uses the sentiment provided by the analytic module 30 to set a priority for the action. For example, if the user launches an action to open a service request, the system 26 may tag the service request when it is created to include information about the sentiment or provide a high priority to the service request. The higher priority insures that the request is handled by appropriate resources, thereby improving customer satisfaction.

The published content 35 is also associated with a network management services behavior. For example, the response time of the user interface may be modified based on customer sentiment. If the sentiment indicates that the customer is unsatisfied, the response time may be reduced (e.g., reduced network latency, faster application execution time, quicker response from support center).

Network management services may also include action taken by customer support. For example, if sentiment is poor and a network event is reported by one of the network devices, customer support may proactively take action to contact the customer and resolve the issue, rather than waiting for the customer to log into the system and then get preferential treatment. Other actions include dispatching customer support to the customer's site to help with the problem, pre-staging a part, or delivering a tailored workaround or solution once the problem is identified.

The following describes an example of sentiment calculations and attributes used in the calculations. It is to be understood that this is only an example and that other algorithms and attributes may be used without departing from the scope of the embodiments.

In one embodiment, customer sentiment is used to predict what the real-time customer satisfaction is during the life-cycle of a technical assistance center case. The customer sentiment may be used to predict how a customer feels while the case is progressing to provide the support center an opportunity to improve customer satisfaction before the case is closed.

In one example, the customer sentiment starts with a value of five and attributes are used to reduce this starting value. Table I below lists examples of attributes.

EXPIRE column indicates whether customer sentiment will improve after a period of time has transpired since the attribute was triggered, which lowered the customer sentiment. When either the CAN IMPROVE or EXPIRE cells are set to yes, it indicates that a percentage of the points that were decremented from the sentiment value will be given back. If a percentage is not specified, 100% is given back. The last column indicates the value deducted from the starting value (formula). The attributes listed in Table I are described below. The term 'expert' as used herein may refer to any customer support contact (e.g., technical expert, person trained in a specific area). The terms 'workgroup' and 'team' may refer to any group of experts or customer support personnel assigned to support a specific technology, product, service, network, customer, etc.

The 'More than n case transfers' attribute is used to identify cases that are being moved between different technology teams. This results in the customer having to explain their issues over again to a new technical team and being asked for different information each time. Any workgroup changes that occur prior to first customer contact may be excluded. In the example shown in Table I, if the case remains in the same workgroup for 1 week, 50% of the value deducted from the original sentiment value is added back. If another change occurs, the current value is overwritten with the new value.

The 'Expert changes in X time period' attribute indicates the impact to the customer when a case is re-queued with a new expert in the same team (workgroup). This is not as significant as transfers to a new team, as the new contact can typically continue on with the case with little disruption and requests for new data (if needed) correspond to past requests

TABLE I

| ATTRIBUTE | CAN IMPROVE | EXPIRE | FORMULA (value to deduct) |
|---|---|---|---|
| More than n case transfers (Technology Team Changes) | No | Yes - 50% (1 week) | 1-2 changes: deduct 0.15<br>3-4 changes: deduct 0.30<br>5-6 changes: deduct 0.60 |
| Expert changes in X time period | No | Yes (1 week) | 0.25 |
| No response to customer within X time period | Yes (recover 50%) | N/A | 0.50 |
| No case update (Time duration a case has been in the same state with no update from customer support) | Yes (recover 50%) | N/A | Customer pending: 0.05 after 10 working days<br>Customer support pending: 0.20 after 2 working days;<br>Release pending, close service order pending: 0 |
| Number of times expert has been unresponsive (superset of previous 2 attributes) | No | Yes - 50% (2 weeks) | Value deducted is equal to the unrecovered amount in the previous 2 attributes. |
| Age (based on average TTR) | No | No | Average TTR exceeded by 10%: deduct 0.20<br>Average TTR exceeded by 25%: deduct 0.50 |
| Bugs encountered | Yes | No | 0.10 each occurrence |
| Return Material Authorization (RMA) | No | No | 0.15 |
| Initial response time exceeds X time period | No | Yes - 100% (1 week) | 0.20 |
| Other customer support updating case | No | Yes - 100% (3 days) | 0.15 |
| Historical severity changes | Yes (recover 50%) | No | 0.25 |
| Manager involved | No | No | 0.25 |
| Customer sensitivity | N/A | N/A | sensitivity value |

The CAN IMPROVE column indicates whether an action by customer support can improve customer sentiment (i.e., recover deducted value or portion of deducted value). The and are not typically on a completely different technology or product. If the case remains in the same workgroup for one week, the value deducted is added back to the sentiment (i.e., deduction expires). If there is another change, the current value is overwritten with the new one.

The 'No response to customer' attribute tracks the fact that a customer is updating the case (e.g., contacting the expert) or more than one occurrence across a specified time period (e.g., two working days) without a response from the expert. 50% of the deduction is recovered when the expert contacts the customer. The remaining 50% is transitioned to the 'Number of times expert has been unresponsive' attribute (described below).

The 'No case update' attribute is less specific than the previous attribute and has longer time durations before it is triggered. This attribute looks at the duration of time that a case has been in a given state category (customer pending vs. customer support pending) without an update from the expert. It is meant to track longer periods of lack of response. 50% of the deduction is recovered when the expert updates the customer and the remaining 50% is transitioned to the 'Number of times expert has been unresponsive' attribute.

The 'Number of times expert has been unresponsive' attribute is an aggregate summation of the unrecovered deductions of the previous two attributes over the lifetime of the case. Since both of the previous two attributes ('No response to customer' and 'No case update') can be experienced multiple times within the lifecycle of a long case, this attribute will hold the sum of the unrecovered deduction from each occurrence of those attributes. 50% of this attribute expires after a specified period of time (e.g., two weeks).

The 'age' attribute refers to the time from when the case was opened until the case reaches a terminal state (e.g., solution provided, release pending). This is referred to as Time to Resolution (TTR). An average TTR is determined for a technical area (e.g., team, sub-team, workgroup) and that value is used as a baseline. Once the current age exceeds the average TTR for that team by 10%, 0.20 is deducted from the sentiment. Once it exceeds the average TTR by 25%, 0.50 is deducted.

For the 'Bugs encountered' attribute, a deduction is made for each occurrence. The amount deducted may be modified based on whether the case is linked to an unresolved bug or a resolved bug.

Customer sentiment is lower prior to Return Material Authorization (RMA), but this cannot be detected. The sentiment may not recover any points or may recover some points (e.g., 0.10) if the case state transitions to resolved state within a specified period of time (e.g., three business days of part delivery). This provides time to receive part, install, and validate that the new part resolved the issue. The full deduction is not returned because any RMA causes customer dissatisfaction due to the work required to change parts.

The 'Initial response time' attribute is a one-time occurrence attribute that is encountered if a customer opens a case, but there is no contact from customer support in a specified period of time (e.g., first three hours) after the case is opened. 100% of the deduction is recovered after one week, since after a week, the customer is likely to have forgotten the delay in initial contact.

The 'Other customer support updating case' attribute looks at who besides the customer and expert are updating (e.g., adding notes) to a case. If the customer talks to the account team or other engineers it indicates that they are seeking help to resolve the issue quicker. This is generally an indication that they are unhappy with how the case is currently progressing.

The 'Historical severity changes' attribute tracks how many times the customer has escalated the severity of the case. 50% of the value deducted is recovered when the severity is decreased.

The 'Manager involved' attribute is applied if the customer has escalated the case to a manager. For example, a flag may be set in the case if the case has been escalated. This is a direct indication that the customer is unhappy. When the flag is set, 0.25 is deducted from sentiment. This cannot be recovered and does not expire.

The 'Customer sensitivity' attribute is based on past customer encounters separate from the current case. Various algorithms may be used to calculate a customer sensitivity value. The value may be used as a multiplier to the negative attributes or may be used as a threshold.

The attributes and values used in Table 1 and described above are only examples and different attributes, values, or formulas may be used to accommodate various customer interactions or input.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   collecting at a network device in communication with a customer network, data for a customer receiving network management services in the customer network from the network device;
   calculating at the network device, a sentiment for the customer based on said data, said sentiment indicating a satisfaction level of the network management services for the customer;
   modifying at the network device, network management services for the customer based on said sentiment, wherein modifying said network management services comprises modifying content provided to the customer by the network device; and
   transmitting said modified content from the network device to the customer.

2. The method of claim 1 wherein content comprises content for display at a customer device.

3. The method of claim 2 wherein said content comprises a web page.

4. The method of claim 2 wherein said content comprises a user interface configured for receiving a request for services from the customer.

5. The method of claim 2 wherein said content comprises a plurality of network objects associated with network devices and contact objects associated with customer support and wherein at least one of said network objects and contact objects are modified based on said sentiment.

6. The method of claim 1 wherein modifying said network management services comprises modifying a response time for said network services.

7. The method of claim 1 wherein a customer support contact is selected for said network management services based on said sentiment.

8. The method of claim 1 wherein said data comprises data associated with network devices in the network.

9. The method of claim 1 wherein said data comprises attributes associated with customer support and calculating said sentiment comprises starting with a baseline sentiment value and deducting from the baseline value based on said attributes.

10. The method of claim 9 wherein a percentage of the deduction from the baseline value may be recovered after a specified period of time or occurrence of an event.

11. An apparatus comprising:
a processor for processing data collected at the apparatus and transmitting modified content from the apparatus to a customer;
an analytic module for receiving data for the customer receiving network management services in a customer network, and calculating a sentiment for the customer based on said data, said sentiment indicating a satisfaction level of the network management services for the customer;
a services module for modifying network management services for the customer based on said sentiment, wherein modifying said network management services comprises modifying content provided to the customer by the apparatus; and
memory for storing said data.

12. The apparatus of claim 11 wherein said content comprises content for display at a customer device.

13. The apparatus of claim 12 wherein said content comprises a web page.

14. The apparatus of claim 12 wherein said content comprises a user interface configured for receiving a request for services from the customer.

15. The apparatus of claim 12 wherein said content comprises a plurality of network objects associated with network devices and contact objects associated with customer support and wherein at least one of said network objects and contact objects are modified based on said sentiment.

16. The apparatus of claim 11 wherein said data comprises attributes associated with customer support and calculating said sentiment comprises starting with a baseline sentiment value and deducting from the baseline value based on said attributes.

17. The apparatus of claim 16 wherein a percentage of the deduction from the baseline value may be recovered after a specified period of time or occurrence of an event.

18. An apparatus comprising:
logic encoded on one or more non-transitory computer readable media for execution by a processor and when executed by the processor operable to:
collect data for a customer receiving network management services in a customer network;
calculate a sentiment for the customer based on said data, said sentiment indicating a satisfaction level of the network management services for the customer;
modify network management services for the customer based on said sentiment, wherein modifying said network management services comprises modifying content provided to the customer; and
transmit said modified content to the customer.

* * * * *